March 18, 1969  J. P. DUPORT ET AL  3,433,014
DEVICE FOR THE PRODUCTION OF ENERGY IN BURSTS
Filed Jan. 5, 1967

INVENTORS
JACQUES P. DUPORT
MICHEL DE CREVOISIER
BY
ATTORNEY

United States Patent Office 3,433,014
Patented Mar. 18, 1969

3,433,014
DEVICE FOR THE PRODUCTION OF ENERGY IN BURSTS
Jacques P. Duport, Montbonnot, and Michel de Crevoisier, Meylan, France, assignors to Societe Grenobloise d'Etudes et d'Applications Hydrauliques, Grenoble, France, a corporation of France
Filed Jan. 5, 1967, Ser. No. 607,458
Claims priority, application France, Jan. 6, 1966, 4,866; Jan. 10, 1966, 4,868
U.S. Cl. 60—12    7 Claims
Int. Cl. F01k 7/16; F01b 29/08

ABSTRACT OF THE DISCLOSURE

The apparatus herein comprises a tank providing an enlarged chamber for a large volume of working fluid and having a discharge outlet in its lower end portion. A conduit connected to the outlet may direct the working fluid to drive a rotary machine, or to create fluid streams in hydrodynamic testing tunnels. The tank has mounted on its top end a plug providing a chamber in communication with the upper end of the enlarged chamber for the working fluid and containing a charge of gas emitting material, which when triggered, is capable of evolving a large volume of gas for a sustained period to apply upon the working fluid in the enlarged chamber, a high pressure sufficient to discharge the working fluid through the conduit in a long burst of considerable power. The charges of the gas emitting material are activated by intermittently operable triggering means.

---

In hydraulic and wind tunnels employed for testing models or machines in fluid streams of very substantial cross-sectional dimensions and of high flow velocities, especially in subsonic and supersonic wind tunnels, the problem of providing the considerable power requirements of the machnes for driving the fluid around the circuit, is a material one. In the endeavor to provide a practical answer to the problem, the art has among other methods resorted to one which utilizes the energy released by a suddenly expanding compressed gas either directly, as in the case of a wind tunnel, or to set a liquid in motion and form a liquid stream thereof, as in the case of a hydraulic test tunnel. This method however, has been found to possess a number of disadvantages. Due to installation cost considerations, it is necessary to first compress the gas to be suddenly expanded to an extent far beyond the normal fluid stream working pressure in the tunnel. Therefore, in a wind tunnel the released gas will lose much of its stored energy in its expansion. Furthermore, as the gas picks up dirt when it is initially undergoing compression, it needs purifying before being used.

It is the primary purpose of the present invention to provide an improved apparatus applicable to both wind tunnels and to hydraulic test tunnels operating in bursts and which is free of the aforesaid disadvantages of the indicated prior method.

Another object of the invention is to provide means for providing the bursts of working fluid flow in a test tunnel by at least one rotary machine located at a given place in the tunnel and operated intermittently by sudden releases of accumulated energy.

A further object of the invention is to provide an improved means for supplying the sudden bursts of released energy to the rotary machine.

Figure 3:
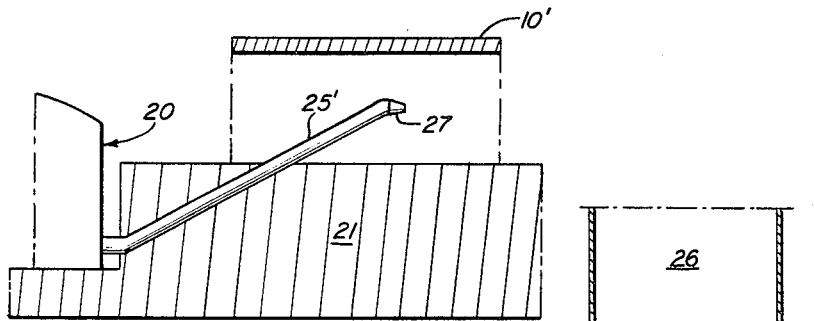
Figure 2:
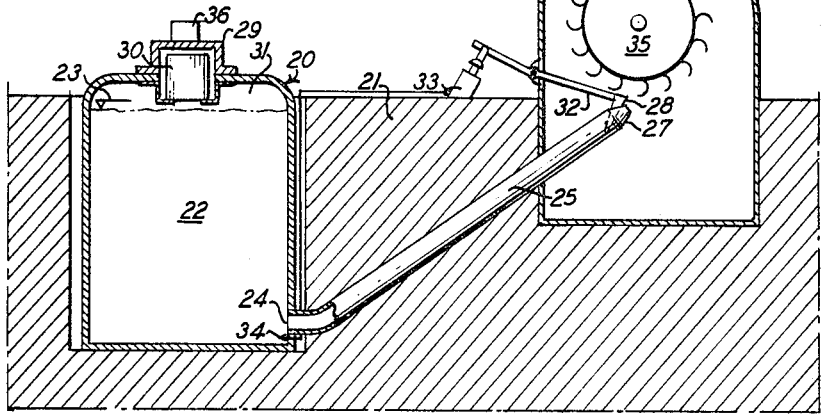
Figure 1:
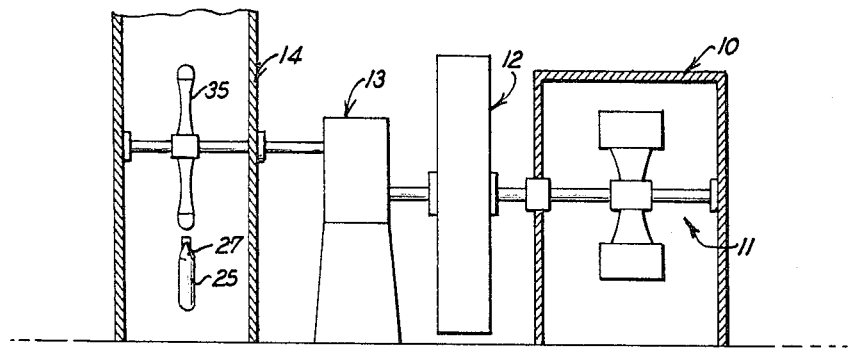

Other objects of the invention, as well as the features and advantages thereof will become apparent from a perusal of the following description, when read in connection with the accompanying drawings, in which FIG. 1 is a schematic view of a system embodying the invention;

FIG. 2 is a vertical view showing schematically an arrangement for producing bursts of energy in accordance with the invention; and FIG. 3 is a schematic view of another embodiment of the invention.

In the drawings, the reference numeral 10 indicates generally a portion of a test tunnel of known construction for testing models or machines under the dynamical action of gases and liquids. The numeral 11 indicates generally a rotary machine for producing a stream of fluid in the test tunnel. The rotary machine 11 may be any suitable known device of the type employed for propelling gas or liquid in test tunnels of the type indicated and may be mounted exteriorly of the tunnel, as is known, instead of being located therein, as is shown. The rotary machine is connected to and driven during the short period of time required for a test by a flywheel 12 having a suitable moment of inertia to accomplish such result. The flywheel 12 is brought up to the requisite speed by a motor system which is low powered compared to the power which would be required by the rotary machine for its operation using a direct drive. The motor system in accordance with the invention may include a suitable gear train 13 connecting the flywheel in driven relation to means 14 operated by bursts of working fluid flow such as, for example, a rotary device of the known "pyrotechnic wheel" type. In accordance with the preferred form of the invention, the driving means 14 is a gas turbine, or a Pelton, Francis, or propeller-type water turbine, all of which are driven directly or indirectly by an expanding gas.

An advantage of the aforesaid turbine type of driving means 14 over the usual type device working on the "in bursts" principle and making direct use of the fluid flow produced by accumulated energy, is that the turbine type enables a closed-circuit fluid flow to be used in the wind tunnel, or hydraulic test tunnel, thus making it easier to control such fluid characteristics as temperature, humidity and dust, or gas content. The energy conversion unit consisting of the turbine running in bursts of power and the rotary machine in the test circuit provides a means of controlling the operating pressure of the circuit which is independent of the pressure of the fluid used to accumulate the necessary energy. A further advantage in connection with wind tunnels is that at least part of the temperature rise of the test fluid due to the operation of the rotary machine can be used to bring the fluid up to the requisite test temperature. By controlling the manner in which the bursts of power are applied to the turbine type of driving means, the latter may be utilized as a direct drive for the rotary machine.

In FIG. 2 of the drawings is shown a driving means 14 which has been found to be especially advantageous in accomplishing the purposes of the invention. The driving means illustrated comprises a tank 20 embedded for safety in a mass of concrete. The tank contains water 22 up to a certain level 23 and is provided with a lower outlet 24 to which is connected one end of a discharge pipe 25 extending up through the concrete into the lower end of a flue 26. The pipe 25 is provided at its upper end with a nozzle 27 having an adjustable deflector 28, the two forming the nozzle of a Pelton wheel 35 rotatably mounted in the flue 26. The tank 20 has a removable plug 29 containing a powder charge in agglomerate form 30. The powder charge may be fired by any suitable type of firing mechanism known to the art and indicated generally in the drawing by the reference numeral 36.

It will be understood from the foregoing that when the powder charge 30 is fired, the gas in space 31 above the level 23 of the water 22 is put under an instantaneous high pressure and the subsequent expansion of such gas violently expels the water from the tank in a burst via the outlet 24, pipe 25 and nozzle 27 of the Pelton wheel 35 in such a way as to drive the latter during the time required for combustion of the powder to take place and the tank to empty out.

It will be noted that the nozzle 27 is set at a level equal to or above the level 23 of the liquid 22 in the tank 20 before the liquid discharge begins. The tank 20 can thus be kept full of liquid until the firing of the charge without the need for a stop valve at the outlet orifice 24. Stop valves are difficult to operate sufficiently fast and might be dangerous if they closed unexpectedly. Consequently, the aforesaid arrangement which eliminates their need assures that no sudden blockage of the tank outlet can occur and therefore provides an excellent safety feature. By setting the nozzle 27 no higher than the water level 23, any empty space above the water level in the nozzle is eliminated before the charge is fired, thereby preventing the creation of surge pressures during the initial violent liquid discharge stage. If circumstances should require it, however, the nozzle could be set at a level higher than the water level 23, provided the powder charge block 30 were shaped to give very slow combustion to begin with in order to ensure that the water will discharge slowly at the initial stage from the nozzle.

It will be understood by the art that the gas producing material can be any suitable powder or liquid capable of emitting gas at such fast rate as to cause an instantaneous high pressure rise in the gas overlying the liquid mass 22 in the tank 20. Where the energy is produced by combustion of a powder, the latter can be in agglomerate form, as above indicated. Preferably, the powder should be in the form of a block having the shape required to control the combustion process according to a definite law as is known to the art. Thus, the block may be shaped so that its combustion starts slowly in order to prevent pressure surge effects in the pipe 25 as previously explained. A safety device in the form of a sparking plug set at a suitable level on the tank will insure that the charge cannot ignite while the tank liquid level is below 23.

It will be observed that for safety reasons, nozzle 27 has no conventional discharge control needle. The turbine deflector 28 is movably mounted in the nozzle 27 and is connected to a control member which lowers it automatically when the tank water level falls to a minimum height below the outlet 24 in order to deflect the hot gases from the final combustion stage away from the runners of the Pelton wheel 35. The control member may be of any suitable construction known to the art and may be constituted of a pivoted lever 32 to which the deflector is connected and the movement of which may be controlled by a solenoid 33 electrically connected to contacts 34 located below the outlet 24. The deflected hot gases will be evacuated through the flue 26. The turbine operation can be controlled by causing the deflector 28 to be actuated by a standard form of governor system as is known to the art.

It will be understood from the foregoing, that the invention enables a burst of liquid to be produced by the use of energy stored under safe economic conditions. In accordance with the preferred embodiment of the invention, the burst of liquid is employed to drive a water turbine with the view of imparting a torque to the shaft of a machine. It is within the contemplation of the invention however, to utilize such burst of liquid directly as a liquid stream for testing models or machines as is shown in FIG. 3 of the drawings, wherein the conduit 25' connected to the tank 20 discharges the fluid directly into the chamber of a test tunnel 10'. It will, therefore, be apparent that the invention is not limited to the example described herein and illustrated in the drawings, but extends to all modifications thereof coming within the scope of the appended claims.

We claim:

1. In combination, a tank providing an enlarged chamber for a large volume of working fluid and having a discharge outlet in its lower end portion, means defining a second chamber spaced from said tank, fluid conduit means connected at one end to said outlet and extending to said second chamber to discharge the working fluid conveyed thereby into said second chamber, charge container means on the top of said tank providing a chamber in communication with the upper end of said enlarged chamber for the working fluid and containing a charge of gas emitting material, said material when triggered being capable of evolving a large volume of gas for a sustained period to apply upon the working fluid in said enlarged chamber a high pressure sufficient to discharge the working fluid through said fluid conduit in a long burst of considerable power, and triggering means intermittently operable to activate the charges of said gas emitting material.

2. The combination defined in claim 1, in which the fluid in said tank is composed of a liquid filling said tank up to a certain level to leave a certain gas space above such level, in which said container means for said charge of gas emitting material is mounted in said tank above said liquid level and the chamber provided thereby is in communication with said gas space so that when said charge is triggered it causes an instantaneous high pressure rise in said gas space sufficient to discharge said liquid in a burst through said discharge outlet.

3. The combination defined in claim 1, including a fluid turbine located in said second chamber, in which the discharge end of said fluid conduit means is constituted of a nozzle arranged to direct fluid to drive said fluid turbine, and including means defining a third chamber spaced from said tank, a rotary machine located in said third chamber for propelling fluid therethrough, and means connecting said rotary machine in driven relation to said fluid turbine.

4. The combination defined in claim 1, including a fluid turbine located in said second chamber, in which said discharge end of said conduit means is constituted of a nozzle having a free opening and arranged to direct fluid to drive said fluid turbine, a deflector movably mounted in said nozzle, and means for controlling the position of said deflector relative to said nozzle, said controlling means being controlled by the level of said working fluid relative to said outlet.

5. The combination defined in claim 1, in which said means defining said second chamber is a flue, and including a fluid turbine rotatably mounted in said flue, the discharge end of said fluid conduit means being contained in said flue and constituted of a nozzle arranged to direct fluid to drive said fluid turbine.

6. The combination defined in claim 3, in which said connecting means includes a flywheel drivingly connected between said rotary machine and said fluid turbine.

7. The combination defined in claim 1, in which said means defining said second chamber is a hydrodynamic tunnel for testing the action of fluids on solid bodies, and in which the burst of working fluid discharged into said second chamber by said fluid conduit means is utilized therein as the testing fluid.

References Cited

UNITED STATES PATENTS

| 978,335 | 12/1910 | Pfau | 253—26 |
| 1,055,880 | 3/1913 | Coster | 60—12 |
| 2,301,098 | 11/1942 | Twyman | 60—53 XR |
| 2,357,625 | 9/1944 | Armbruster | 73—117.1 |
| 2,954,206 | 9/1960 | Crawford | 253—24 |

EDGAR W. GEOGHEGAN, *Primary Examiner.*

U.S. Cl. X.R.

60—26.11; 73—147; 253—24; 317—100